(12) United States Patent
Fessler et al.

(10) Patent No.: US 9,673,741 B2
(45) Date of Patent: Jun. 6, 2017

(54) SYSTEM FOR SUPPLYING ELECTRICAL POWER TO A LOAD AND CORRESPONDING POWER SUPPLY METHOD

(71) Applicant: GE Energy Power Conversion Technology Ltd, Warwickshire (GB)

(72) Inventors: Eric Fessler, Belfort (FR); Gilbert-Philippe Crouzet, Belfort (FR); Loic LeClere, Belfort (FR)

(73) Assignee: GE ENERGY POWER CONVERSION TECHNOLOGY LTD, Warwickshire (GB)

( * ) Notice: Subject to any disclaimer, the term of this patent is extended or adjusted under 35 U.S.C. 154(b) by 44 days.

(21) Appl. No.: 14/746,930

(22) Filed: Jun. 23, 2015

(65) Prior Publication Data
US 2015/0372625 A1    Dec. 24, 2015

(30) Foreign Application Priority Data
Jun. 23, 2014    (EP) ..................................... 14305980

(51) Int. Cl.
| | | |
|---|---|---|
| *H02P 9/04* | (2006.01) | |
| *H02P 9/46* | (2006.01) | |
| *H02P 9/08* | (2006.01) | |
| *H02J 1/00* | (2006.01) | |

(52) U.S. Cl.
CPC . *H02P 9/46* (2013.01); *H02P 9/08* (2013.01)

(58) Field of Classification Search
USPC ................................ 322/8, 14; 363/127, 132
See application file for complete search history.

(56) References Cited

U.S. PATENT DOCUMENTS

| | | | |
|---|---|---|---|
| 3,675,117 A | | 7/1972 | Reimers |
| 4,219,768 A | * | 8/1980 | Gobaud ..................... H02J 3/14 |
| | | | 322/28 |
| 5,594,322 A | | 1/1997 | Rozman et al. |
| 5,905,646 A | * | 5/1999 | Crewson .................. H03K 3/57 |
| | | | 363/132 |
| 7,253,537 B2 | | 8/2007 | Weng et al. |
| 7,286,906 B2 | | 10/2007 | Richards |
| 7,576,443 B2 | | 8/2009 | Raju |

(Continued)

FOREIGN PATENT DOCUMENTS

| | | |
|---|---|---|
| CN | 101005204 A | 7/2007 |
| WO | 2009082375 A1 | 7/2009 |

OTHER PUBLICATIONS

Ahmed et al., "Wind Energy Dc Supply-Based Induction Generator with Static VAR Compensator and AC Voltage Regulator", 26th Annual International Telecommunications Energy Conference, Sep. 2004, pp. 689-696.

(Continued)

*Primary Examiner* — Pedro J Cuevas
(74) *Attorney, Agent, or Firm* — GE Global Patent Operation; Scott R. Stanley

(57) ABSTRACT

This system for supplying electrical power to a load includes an asynchronous generator including a cage rotor intended to be driven by motor means and a rectifier adapted to rectify the voltage delivered by the generator. The rectifier is a rectifier employing unidirectional electronic components. The power supply system further includes a reactive power source for magnetizing the asynchronous generator.

19 Claims, 3 Drawing Sheets

(56) References Cited

U.S. PATENT DOCUMENTS

| | | | |
|---|---|---|---|
| 7,724,548 B2 | 5/2010 | Jones et al. | |
| 7,741,732 B2 | 6/2010 | Black et al. | |
| 7,851,936 B2 | 12/2010 | Bolin | |
| 8,629,572 B1 | 1/2014 | Phillips | |
| 2002/0153858 A1* | 10/2002 | Schulz | H02P 25/092 |
| | | | 318/701 |
| 2004/0119292 A1* | 6/2004 | Datta | F03D 7/0272 |
| | | | 290/44 |
| 2011/0198847 A1 | 8/2011 | Hopewell | |
| 2013/0016546 A1* | 1/2013 | Mountain | H02P 9/48 |
| | | | 363/127 |
| 2013/0146254 A1* | 6/2013 | Jeon | H05K 7/20927 |
| | | | 165/104.11 |
| 2013/0282313 A1* | 10/2013 | Wank | G01R 31/42 |
| | | | 702/58 |
| 2014/0103886 A1* | 4/2014 | Heier | H02J 3/16 |
| | | | 323/207 |
| 2016/0294301 A1* | 10/2016 | Yokoyama | H02M 7/003 |
| 2016/0380554 A1* | 12/2016 | Baur | H03K 17/08142 |
| | | | 363/127 |
| 2016/0380557 A1* | 12/2016 | Werker | H02M 7/5387 |
| | | | 363/132 |

OTHER PUBLICATIONS

Peng et al., "Research on Low Power Marine Current Power Generation System", Research Journal of Applied Sciences, Engineering and Technology, Nov. 25, 2013, pp. 4030-4039, vol. No. 6, Issue No. 21.

European Search Report and Opinion issued in connection with corresponding EP Application No. 14305980.6 on Feb. 5, 2015.

\* cited by examiner

SYSTEM FOR SUPPLYING ELECTRICAL POWER TO A LOAD AND CORRESPONDING POWER SUPPLY METHOD

BACKGROUND

Embodiments of the present invention relate to the supply of electrical power to a load and, more particularly, to an electrical power supply system intended to provide a continuous power supply to a power supply network of a boat.

In the prior art, electrical power supply systems may be based on a synchronous electrical machine including a wound rotor and an electric circuit for exciting the synchronous machine.

Asynchronous or induction generators, notably including a squirrel cage rotor, are reliable, mechanically simple and, cost efficient, and also constitute a solution for implementing an electrical power supply source.

Induction generators generally include at the output a rectifier circuit intended to convert the AC voltage delivered by the generator into a DC voltage.

A rectifier based on insulated gate bipolar transistors (IGBT) is conventionally used for this.

Such rectifiers make it possible to provide the function of magnetizing the generator efficaciously. They have a number of drawbacks, however, notably relating to the fact that they are costly and relatively complex.

Also, IGBT rectifiers are not suitable for carrying a high current. Consequently, an IGBT rectifier is generally not appropriate for delivering a high short-circuit current if a short-circuit occurs in a distribution network to which the rectifier is connected, without overspecifying the rectifier, i.e. without using a large number of costly IGBT transistors.

SUMMARY OF INVENTION

Embodiments of the invention is overcome this drawback and reduce the rating of a power supply system including an asynchronous generator at the same time as enabling magnetization of the generator.

Embodiments of the invention propose an electrical power supply system including an asynchronous generator of small overall size capable of withstanding high short-circuit currents.

In a first aspect, the invention therefore consists in a system for supplying electrical power to a load, including an asynchronous generator including a cage rotor intended to be driven by motor means and a rectifier adapted to rectify the voltage delivered by the generator.

In accordance with one feature of this power supply system, the rectifier is a rectifier employing unidirectional electronic components. Furthermore, the electrical power supply system includes a reactive power source for magnetizing the asynchronous generator.

In accordance with another feature of the invention, the reactive power source includes a variable reactive power source.

In accordance with a further feature of the invention, the variable reactive power source constitutes means for controlling the output voltage of the rectifier.

In one embodiment, the variable reactive power source includes a voltage inverter employing insulated gate bipolar transistors and at least one capacitor.

In accordance with a further feature of the power supply system in accordance with the invention, the reactive power source further includes a fixed reactive power source.

In an embodiment, the fixed reactive power source includes an RLC circuit.

In an embodiment, the fixed reactive power source constitutes means for filtering harmonic currents coming from the variable reactive power source.

In an embodiment, the reactive power source may constitute means for filtering harmonic currents coming from the rectifier.

In one embodiment, the power supply system includes a circuit for gradually charging capacitors of the variable reactive power source associated with a set of switches for supplying electrical power to a DC voltage bus.

The power supply system may further include a set of filter capacitors connected to the output of the rectifier.

For example, the unidirectional electrical components are diodes or thyristors.

In a second aspect, the invention also consists in a method of supplying electrical power to a load by means of an electrical power supply system including an asynchronous generator including a cage rotor driven by motor means and a rectifier employing unidirectional electronic components adapted to rectify the voltage delivered by the generator, wherein the asynchronous generator is magnetized by a reactive power source.

In one embodiment, said reactive power source including a variable reactive power source including a voltage inverter, said voltage inverter drives in rotation a shaft coupling the generator and the motor means up to a jogging speed of the asynchronous generator on starting or decelerating the power supply system.

BRIEF DESCRIPTION OF THE DRAWINGS

Other objects, features and advantages of the invention will become apparent on reading the following description given by way of nonlimiting example only and with reference to the appended drawings, in which.

DETAILED DESCRIPTION

Figure 1:
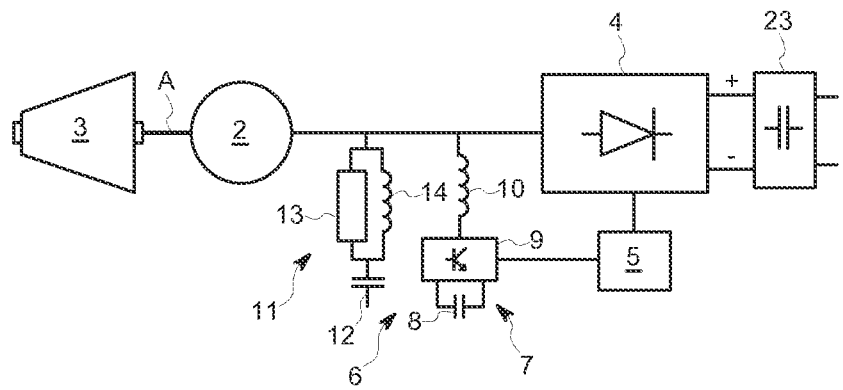
FIG. 1 is a block diagram showing the architecture of an electrical power supply system in accordance with the invention.

Refer first to FIG. 1, which shows the general architecture of a system 1 for supplying a load with direct current electrical power.

In the embodiment envisaged, this power supply system 1 is intended to be installed on a boat to constitute a DC voltage source. Of course, it is within the scope of the invention to supply power to any other type of load.

The power supply system 1 essentially includes a three-phase induction generator 2 driven in rotation by motor means 3, for example a diesel engine or a steam turbine or gas turbine, and a rectifier 4 for converting the AC voltage delivered by the generator into a DC voltage.

As shown, the generator 2 and the motor means 3 are connected by a common shaft A, the combination constituting a motor-alternator.

The induction generator 2 is a squirrel cage asynchronous generator and therefore has a structure that is mechanically simple, reliable and of relatively low cost.

For its part, the rectifier 4 includes unidirectional electronic components. These unidirectional electronic components may be of the controlled type. In an embodiment, the rectifier elements of the rectifier 4 therefore consists of diodes or thyristors, in contrast to the prior art which uses a rectifier bridge based on IGBT transistors.

If the rectifier 4 is based on thyristors, a control circuit 5 controls the thyristors, and notably the trigger of each thyristor, to rectify the alternating current delivered by the generator 2.

Moreover, the power supply system 1 includes a reactive power source 6 for magnetizing the magnetic circuit of the generator 2.

The reactive power source firstly includes a variable reactive power source 7 including a set of capacitors 8 and an inverter circuit 9 shunt-connected between the generator 2 and the rectifier 4 via an inductance 10.

Here the inverter circuit is based on IGBT transistors controlled by the control circuit 5, for example using pulse width modulation (PWM).

As indicated hereinafter, this variable reactive power source 7 constitutes an active filter for filtering harmonic currents coming from the rectifier 4. It also regulates the DC voltage delivered at the output of the rectifier 4 by controlling the magnetization of the generator 2.

The reactive power source 6 secondly includes a fixed reactive power source 11 consisting here of an RLC circuit shunt-connected between the generator 2 and the rectifier 4.

This fixed source 11 includes one or more capacitors 12 connected to a resistance 13 and to an inductance 14 connected in parallel.

The fixed reactive power source 11 constitutes a passive filter for filtering harmonic currents coming from the rectifier 4 and passively filtering harmonic currents coming from the active filter 7.

It also participates in the magnetization of a portion of the generator 2.

The IGBT transistors in the inverter 9 essentially supply the reactive power necessary for magnetizing the generator 2. By virtue of the shunt connection of the inverter, it plays no part in rectifying the voltage delivered by the generator and so the IGBT transistors can be appropriately rated to provide this magnetization, which makes it possible to reduce the constraints on the rating of these transistors.

The rating of these transistors can be further reduced because of the presence of the fixed reactive power source 11 that also participates in the magnetization of the generator. It will be noted that this fixed source 11 is optional, however, and could be omitted if the number of IGBT transistors in the inverter 9 remains acceptable. In an embodiment, however, the fixed reactive power source constitutes a passive filter that filters the harmonic content generated when the inverter is operating.

Moreover, the variable reactive power source 7 and the fixed reactive power source 11 that are parallel-connected and shunt-connected relative to the generator 2 and the rectifier 4 provide efficacious filtering of harmonic distortion generated by the rectifier 4 so that harmonic currents generated by the rectifier 4 are filtered by the active and passive filters without reaching the induction generator 2, which can therefore also be appropriately rated.

Figure 2:
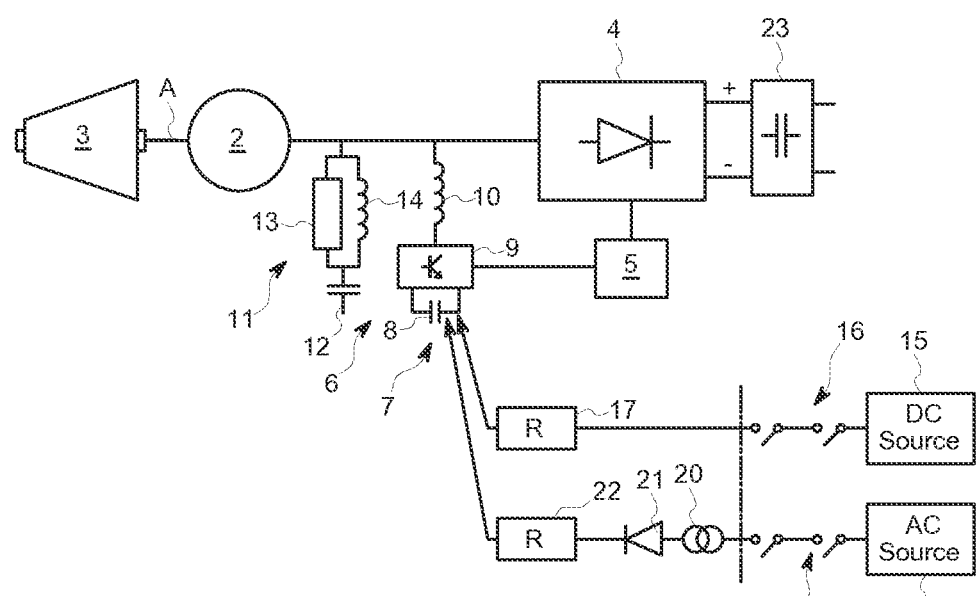
FIG. 2 shows the FIG. 1 system during starting.

Refer now to FIG. 2, which shows the FIG. 1 power supply system during a starting phase.

During this phase, the capacitors in the reactive power source 6 are progressively charged in order to avoid a sudden increase in the generated current caused by the presence of these capacitors.

As FIG. 2 shows, in a first embodiment, this pre-charging may be affected by means of a direct current source 15 connected via a switch 16 and a resistance 17 to the reactive power source 6.

The source 15 consists of batteries, for example.

It is equally possible to effect this pre-charging instead from an alternating current source 18 connected by a switch 19 to a voltage matching transformer 20, a rectifier diode 21 converting the current coming from the source 18 into a direct current and a resistance 22 connected to the reactive power source 6.

During pre-charging, the capacitors 8 associated with the inverter 9 are charged progressively. When the variable reactive power source 7 becomes operational, it in turn gradually pre-charges the capacitors 12 of the passive filter 11.

Figure 3:
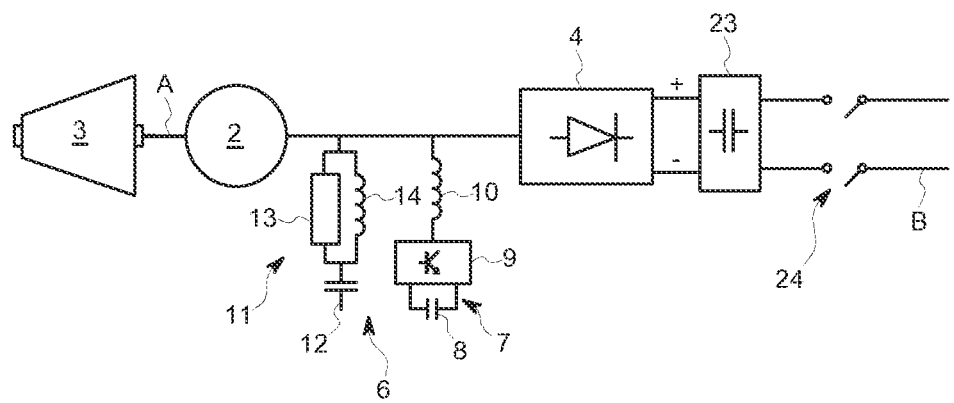
FIG. 3 shows the FIG. 1 system during a later phase of starting.

Moreover, during this starting phase, the inverter 9 is controlled by the control circuit 5 to charge filter capacitors 23 at the output of the rectifier 4 and to magnetize the generator 2 slowly, leading to a consequential gradual increase in the output voltage of the rectifier. When a nominal voltage level is reached at the output of the rectifier, the control unit 5 closes a circuit-breaker 24 to supply power to a DC voltage bus B (FIG. 3).

Figure 4:
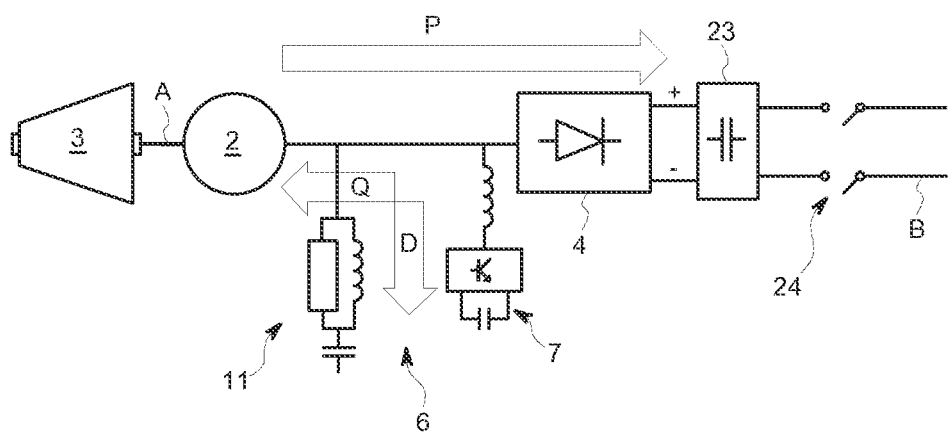
FIG. 4 shows the flows of active power, reactive power and deforming power during nominal functioning of the FIG. 1 power supply system.

As FIG. 4 shows, during nominal operation of the power supply system the generator 2 delivers active power P to the rectifier 4, which converts the AC voltage delivered at the output of the generator into a DC voltage.

Moreover, as previously indicated, the reactive power Q necessary for magnetizing the generator 2 is supplied on the one hand by the variable source 7 and on the other hand by the fixed source 11.

The voltage level delivered at the output of the power supply system is controlled via the inverter 9. Accordingly, a fixed proportion of the reactive power is supplied by the fixed source 11, the remainder being supplied, in controlled manner, by the variable source 7 to control the output voltage level, and the number of IGBT transistors necessary for magnetizing the generator 2 can then be reduced.

Moreover, the deforming power D containing harmonic currents coming from the rectifier 4 on the one hand and from the inverter 9 on the other hand is filtered in the reactive power source 6.

Figure 5:
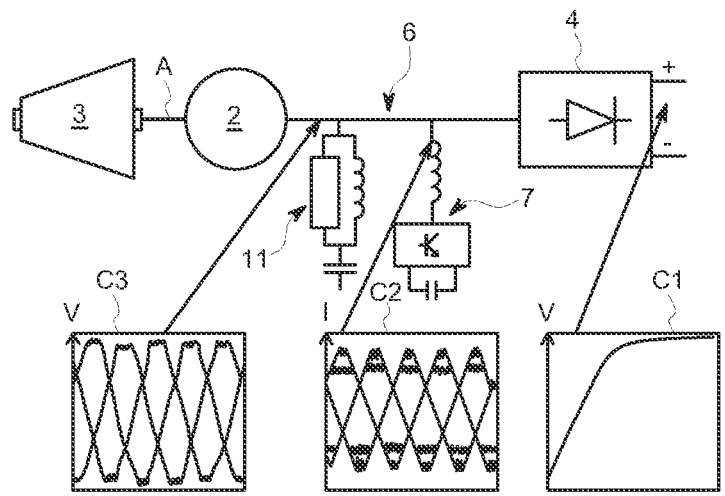
FIG. 5 shows the waveforms of the voltages and currents at characteristic points of the FIG. 1 system during magnetization of the asynchronous generator.

As shown in FIG. 5, which shows the evolution of the voltage and the current at characteristic points of the circuit of the power supply system, the output voltage of the power supply system at the output of the rectifier 4 evolves slowly up to the nominal value during the starting sequence.

The current flowing toward the filters, and notably toward the active filter, has a relatively high level of harmonic distortion (curve C2). On the other hand, the voltage at the output of the generator 2 has a low level of harmonic distortion because of the filtering effected in the reactive power source.

Figure 6:
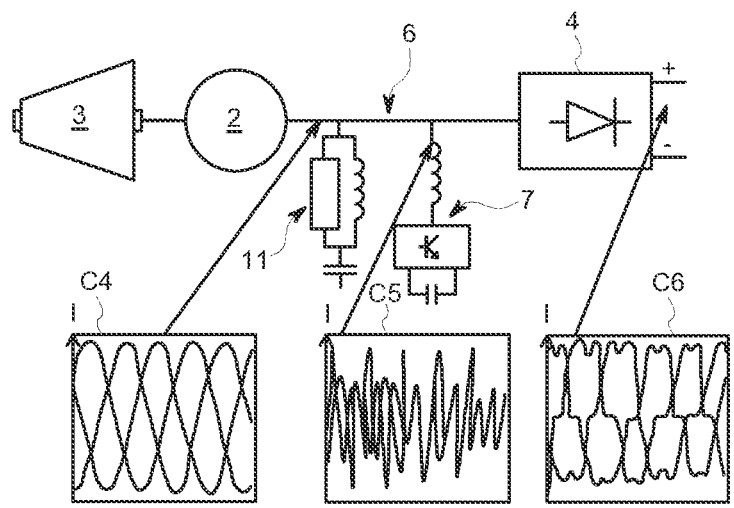
FIG. 6 shows the waveform of the voltages at characteristic points of the electrical power supply system in accordance with the invention during active filtering.

In fact, referring to FIG. 6, the curve C4 shows that it is possible to obtain at the output of the generator 2 a current with no harmonic content if a component C5 complementary to that of an ideal signal free of distortion is injected into the signal C6 coming from the rectifier.

It will be noted that the embodiment of the invention that has just been described, and notably the active filter 7, may be used to jog the motor-alternator to limit effects linked to thermomechanical stresses on the shaft line A by maintaining the speed of the motor-alternator at the jogging speed during deceleration or driving the motor-alternator up to the jogging speed during acceleration on starting the motor-alternator.

In this operating mode, the active filter that is used as an IGBT-based voltage inverter is responsible for supplying power to the generator 2 to operate it as a motor. Therefore, on starting the motor-alternator, the inverter of the active filter supplies the torque necessary for starting the shaft A, and then drives the asynchronous generator up to the jogging speed. After the jogging speed has been reached, the motor means 3 take over to maintain rotation and acceleration of the shaft line A.

Similarly, on stopping the system, when the motor means 3 have decelerated and are freewheeling, and when the shaft line has reached the jogging speed, the inverter 9 takes over and drives the asynchronous generator to maintain the jogging speed.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for supplying electrical power to a load, the system comprising:
    an asynchronous generator comprising a cage rotor driven by a motor;
    a rectifier connected to the asynchronous generator and configured to rectify the voltage delivered by the asynchronous generator, wherein the rectifier employs unidirectional electronic components; and
    a reactive power source for magnetizing the asynchronous generator, the reactive power source shunt-connected between the asynchronous generator and the rectifier.

2. The system according to claim 1, wherein the reactive power source comprises a variable reactive power source.

3. The system according to claim 2, wherein the variable reactive power source is configured to control the output voltage of the rectifier.

4. The system according to claim 2, wherein the variable reactive power source comprises a voltage inverter employing insulated gate bipolar transistors and at least one capacitor.

5. The system according to claim 2, wherein the reactive power source further comprises a fixed reactive power source.

6. The system according to claim 5, wherein the fixed reactive power source comprises an RLC circuit.

7. The system according to claim 5, wherein the fixed reactive power source is configured to filter harmonic currents coming from the variable reactive power source.

8. The system according to claim 3, wherein the reactive power source is configured to filter harmonic currents coming from the rectifier.

9. The system according to claim 1, further comprising a circuit for gradually charging capacitors of the variable reactive power source associated with a set of switches for supplying electrical power to a DC voltage bus.

10. The system according to claim 1, further comprising a set of filter capacitors connected to the output of the rectifier.

11. The system according to claim 1, wherein the unidirectional electrical components are diodes or thyristors.

12. The system according to claim 1, wherein the reactive power source comprises a variable reactive power source.

13. The system according to claim 12, wherein the variable reactive power source is configured to control the output voltage of the rectifier.

14. The system according to claim 13, wherein the variable reactive power source comprises a voltage inverter employing insulated gate bipolar transistors and at least one capacitor.

15. The system according to claim 14, wherein the reactive power source further comprises a fixed reactive power source.

16. The system according to claim 12, wherein the variable reactive power source comprises a voltage inverter employing insulated gate bipolar transistors and at least one capacitor.

17. The system according to claim 12, wherein the reactive power source further comprises a fixed reactive power source.

18. A method of supplying electrical power to a load by an electrical power supply system comprising an asynchronous generator comprising a cage rotor driven by a motor connected to a rectifier employing unidirectional electronic components configured to rectify the voltage delivered by the asynchronous generator, and magnetizing the asynchronous generator by a reactive power source shunt-connected between the asynchronous generator and the rectifier.

19. The method according to claim 18, wherein the reactive power source comprises a variable reactive power source comprising a voltage inverter, and the voltage inverter drives in rotation a shaft coupling the asynchronous generator and the motor up to a jogging speed of the asynchronous generator on starting or decelerating the electrical power supply system.

* * * * *